United States Patent
Rode

(10) Patent No.: US 8,898,643 B2
(45) Date of Patent: Nov. 25, 2014

(54) APPLICATION TRACE REPLAY AND SIMULATION SYSTEMS AND METHODS

(75) Inventor: Matthias Rode, Speyer (DE)

(73) Assignee: SAP SE, Walldorf (DE)

(*) Notice: Subject to any disclaimer, the term of this patent is extended or adjusted under 35 U.S.C. 154(b) by 57 days.

(21) Appl. No.: 13/527,343

(22) Filed: Jun. 19, 2012

(65) Prior Publication Data

US 2013/0339931 A1  Dec. 19, 2013

(51) Int. Cl.
*G06F 9/44* (2006.01)

(52) U.S. Cl.
USPC ............ 717/128; 717/111; 717/135; 717/167

(58) Field of Classification Search
CPC combination set(s) only.
See application file for complete search history.

(56) References Cited

U.S. PATENT DOCUMENTS

| | | | |
|---|---|---|---|
| 6,145,121 A * | 11/2000 | Levy et al. | 717/135 |
| 6,715,134 B2 * | 3/2004 | Chang et al. | 716/106 |
| 7,735,127 B1 * | 6/2010 | Rive et al. | 726/12 |
| 8,046,202 B1 * | 10/2011 | Yang et al. | 703/6 |
| 8,620,629 B1 * | 12/2013 | Li et al. | 703/2 |
| 8,738,895 B2 * | 5/2014 | Chen et al. | 713/100 |
| 2002/0087949 A1 * | 7/2002 | Golender et al. | 717/124 |
| 2002/0174415 A1 * | 11/2002 | Hines | 717/127 |
| 2003/0167450 A1 * | 9/2003 | Chang et al. | 716/4 |
| 2004/0216082 A1 * | 10/2004 | Sun | 717/100 |
| 2005/0283457 A1 * | 12/2005 | Sonkin et al. | 707/1 |
| 2006/0101416 A1 * | 5/2006 | Callahan et al. | 717/128 |
| 2007/0112549 A1 * | 5/2007 | Lau et al. | 703/13 |
| 2009/0007279 A1 * | 1/2009 | Alkove et al. | 726/28 |
| 2009/0037193 A1 * | 2/2009 | Vempati et al. | 705/1 |
| 2009/0055154 A1 * | 2/2009 | Holland et al. | 703/22 |
| 2009/0248611 A1 * | 10/2009 | Xu et al. | 707/1 |
| 2010/0274535 A1 * | 10/2010 | McDaniel | 703/1 |
| 2011/0119287 A1 * | 5/2011 | Chen et al. | 707/768 |
| 2012/0204156 A1 * | 8/2012 | Kettley et al. | 717/128 |
| 2013/0305030 A1 * | 11/2013 | Chen et al. | 713/100 |
| 2013/0339397 A1 * | 12/2013 | Herasymchuk | 707/803 |

* cited by examiner

*Primary Examiner* — Chameli Das

(74) *Attorney, Agent, or Firm* — Schwegman Lundberg & Woessner, P.A.

(57) ABSTRACT

Example systems and methods for trace replay and simulation are presented. The system creates a trace entry for each one of a plurality of transactions through the server interface for a client, A message type and message data are recorded into the trace entry for each one of the plurality of transactions. A collection of trace entries for an individual one of the plurality of clients is transferred to a trace player. A client identifier is replaced in the trace entry with an identifier associated with the trace player, An interaction between the server and the clients is replayed.

22 Claims, 7 Drawing Sheets

US 8,898,643 B2

APPLICATION TRACE REPLAY AND SIMULATION SYSTEMS AND METHODS

TECHNICAL FIELD

This document generally relates to systems and methods for simulation and testing of software and multi-device systems, and particularly, but not by way of limitation, to simulation and testing of applications in a client server environment.

BACKGROUND

Software developers typically invest many hours testing each section or module of software they develop to help ensure that the software will operate as expected without generating errors, faults, or other execution maladies. Such testing may include tests executed to test functional, interactive, and communication behavior of the software within a development environment, such as that provided by a testing lab that includes one or more representative hardware systems: However, despite attempts to deliver error-free software to the user, untested or unanticipated uses of the software may cause problems to occur. Problems may occur or only be detected when hardware that was not part of a testing lab is used to operate or interact with the software.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

To detect sources of errors in such cases, some software provides a tracing mode, in which the interactions or communications of the software is recorded for subsequent perusal by software developers or maintenance personnel. By reviewing the resulting trace, which is often provided in a log file or similar data structure, the developer may determine the cause of the error and revise the software to eliminate it. In some cases, message types and communication data associated with software interactions may be added to the log file to provide useful information to the developer.

At least some of the embodiments described herein provide various techniques for tracing application interactions when an application accessed by an application on a remote device, and replaying that trace in a environment different from the remote device. Examples of object-oriented languages employable for producing the application interactions, the tracing mechanism, and trace replay systems include ABAP® (Advanced Business Application Programming) by SAP AG, Java® by Sun Microsystems, Inc., and others.

The trace replay systems facilitate inspection and debugging of the applications and their respective systems by, for example, recording interactions for later analysis and testing of the applications. Described below are techniques for replaying recorded traces in an environment other than where the trace was recorded. Any particular tracing mechanism according to the embodiments discussed herein may be utilized to record the interactions between multiple devices or software applications. Other aspects of the embodiments discussed herein may be ascertained from the following detailed description.

Figure 1:
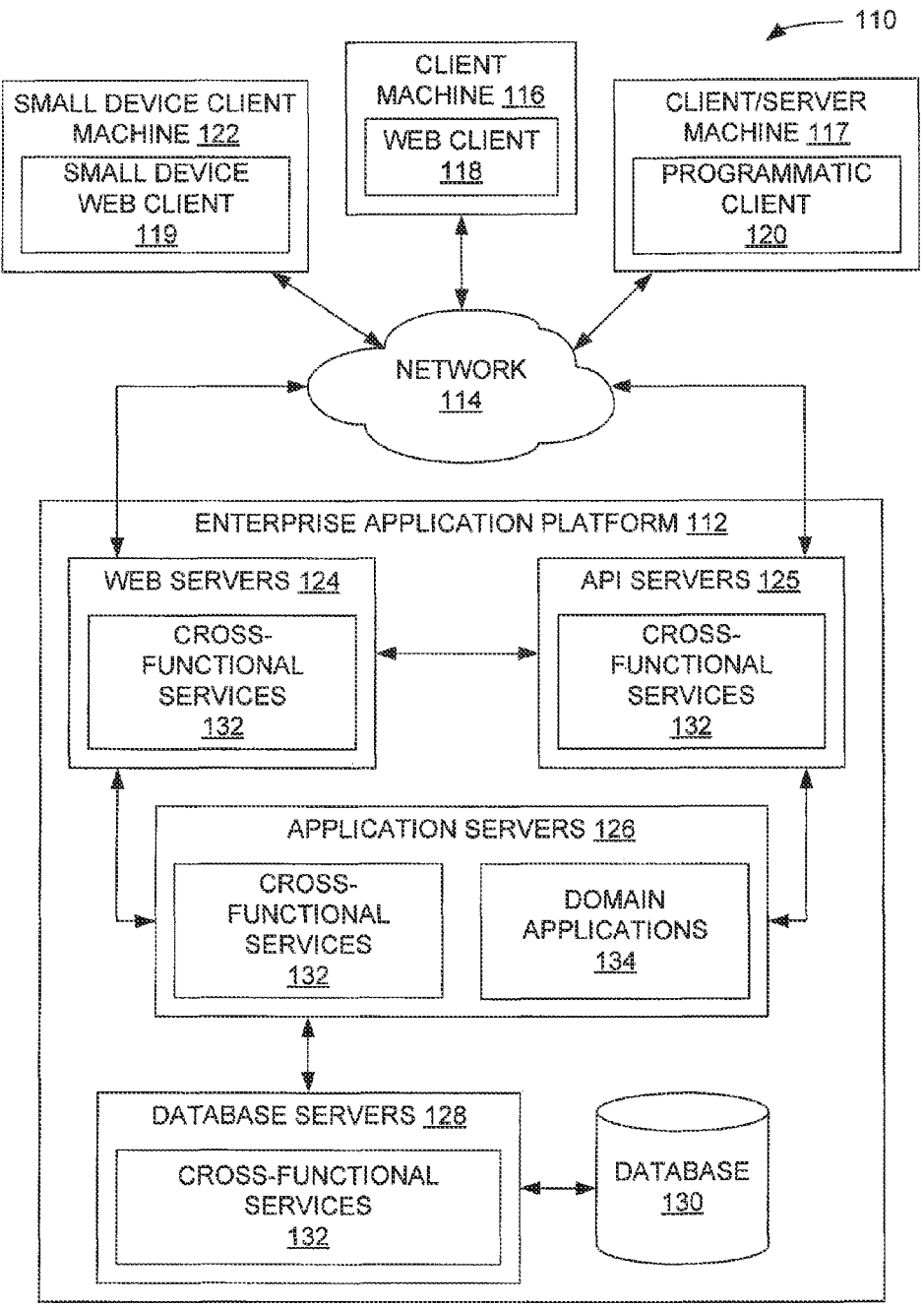
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft Corporation), a small device client machine 122 with a small device web client 119 (e.g., a browser without a script engine), and a client/server machine 117 with a programmatic client 120.

Turning specifically to the enterprise application platform 112, web servers 124 and application program interface servers 125 are coupled to, and provide web and programmatic interfaces to, application servers 126. The application servers 126 are, in turn, shown to be coupled to one or more database servers 128 that may facilitate access to one or more databases 130. The web servers 124, application program interface servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition; the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
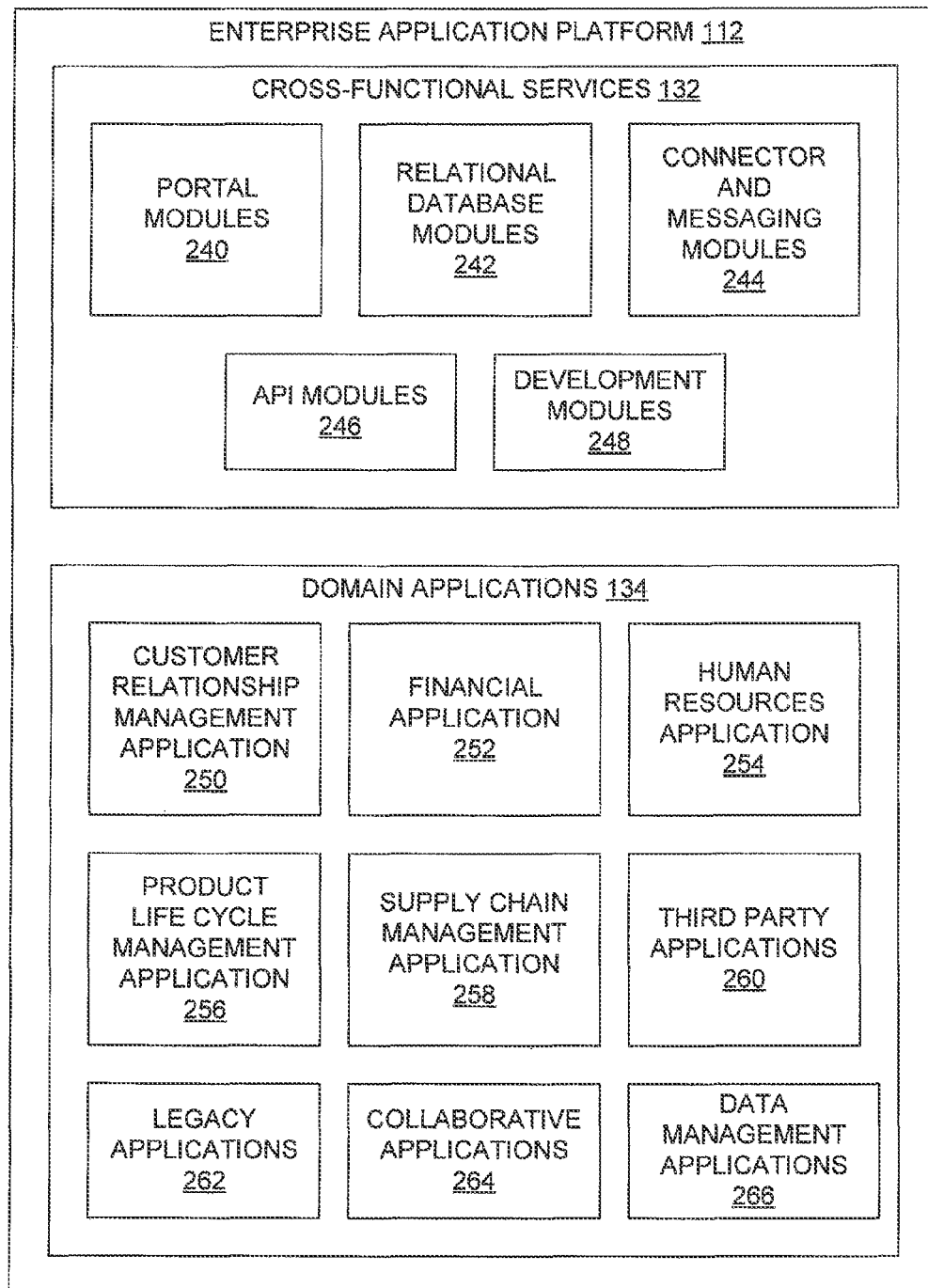
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may he utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module, in addition, the portal modules 240 may comply with web services standards and/or utilize a variety of Internet technologies, including, but not limited to, the JAVA programming language, J2EE, SAP's Advanced Business Application Programming (ABAP®) Language and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector, and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included in the platform 112 as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
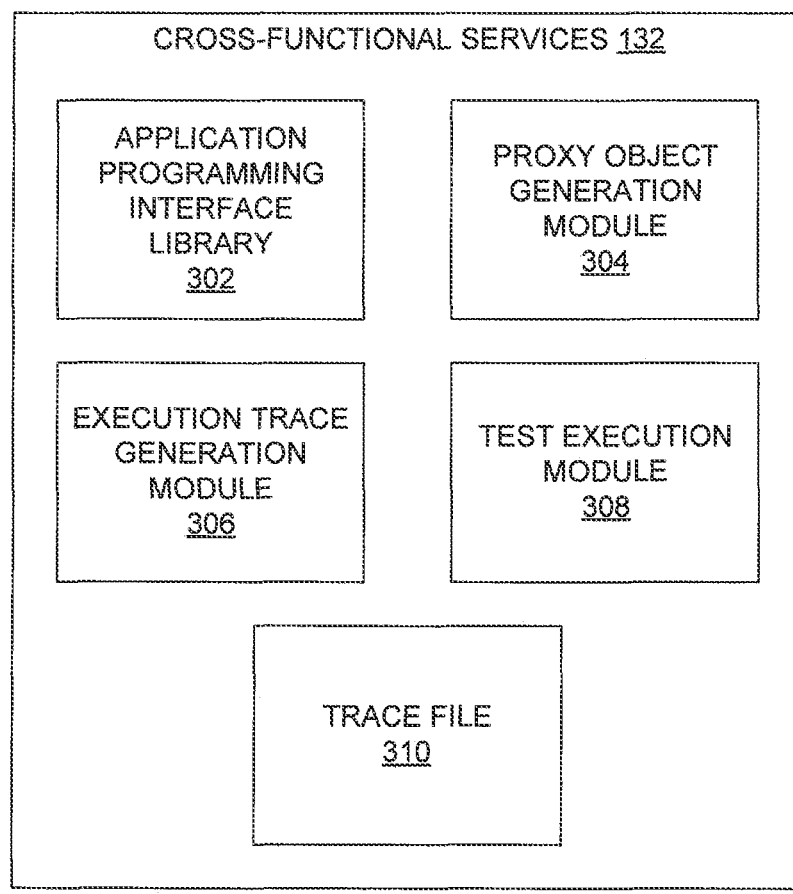
FIG. 3 is a block diagram of example modules utilized in the cross-functional services of FIG. 1 for systems and methods of replaying a trace and simulating an application.

FIG. 3 is a block diagram of example modules employable in the cross-functional services 132 of FIG. 1 for systems and methods of tracing an. API. In the example of FIG. 3, the cross-functional services 132 include an application programming interface library 302, a proxy object generation module 304, an execution trace generation module 306, a test execution module 308, and a trace file 310 or similar data structure. In some implementations, one or more of these modules may be incorporated in other modules of the cross-functional services 132. For example, the API library 302 may exist as one or more of the API modules 246 (FIG. 2), which may expose interfaces of one or more of the domain applications 134 (FIG. 2) for use by one or more client machines 116, 117, and 122 (FIG. 1). In another implementation, one or more of the modules 302 through 310 may exist as one or more of the development modules 248 (also FIG. 2). Further, any of the modules 302 through 310 may be combined into fewer modules, or may be partitioned into a greater number of modules. In addition, while the embodiments discussed herein presume the use of the client-server architecture of the system 110 of FIG. 1, the modules 302 through 310 may be employed in a peer-to-peer arrangement, or even within a single computing system hosting both the API and the application accessing the API.

The API library 302 may define one or more object-oriented classes by which objects of the API may be created. The created API objects may include methods available for use by an external application to access the various domain applications 134 provided in the enterprise application platform 112 (FIG. 1). As described more fully below, the use of the API objects by the external application may be traced to allow analysis of the functioning of the API and the use of the API by the external application. The API objects may be structured such that the external application need only access one or a few "root" API objects directly to perform its desired functions. In this example, the external application may access other API objects via the root API objects. In other cases, a significant number of API objects may be accessible to the application directly. Also, some API libraries may be designed to allow only one-way calls of API methods from the external application, while other API libraries may include objects that call methods of the external application, thus facilitating a two-way calling environment. Such an environment facilitates "eventing," in which the API may asynchronously alert the external application to an event detected by the API. In some implementations, the design or structure of the API may be considered in determining how the tracing of the API is best implemented.

The proxy object generation module 304 may generate or create the one or more proxy objects responsible for recording method calk and other information involving the use of the API. In one example, the API library 302 may include or make reference to the proxy object generation module 304 to facilitate the creation of the proxy objects in response to the creation of one or more of the API objects. In another example, the functionality of the proxy object generation module 304 may be incorporated into one or more Of the API classes such that a call to a constructor method for an API object may result in the creation of the both the intended API object and its corresponding proxy object. Other implementations of the proxy object generation module 304 are also possible.

The execution trace generation module 306 may receive the recorded method calls and other related information from the one or more proxy objects created via the proxy object generation module 304 and generate a trace data structure, such as the trace file 310. In one example, the trace file 310 may be a human-readable (e.g., textual or XML) sequential listing of the various Method calls made to the API, possibly along with parameters and return values associated with those calls. Other information that may be recorded by the proxy objects may also be included. In another example, the execution trace generation module 306 may generate a trace file 310 that includes machine-executable or machine-interpretable information, such as a sequence of method calls and associated data that may be executed by the test execution module 308 to recreate the recorded execution of the API.

Figure 4A:
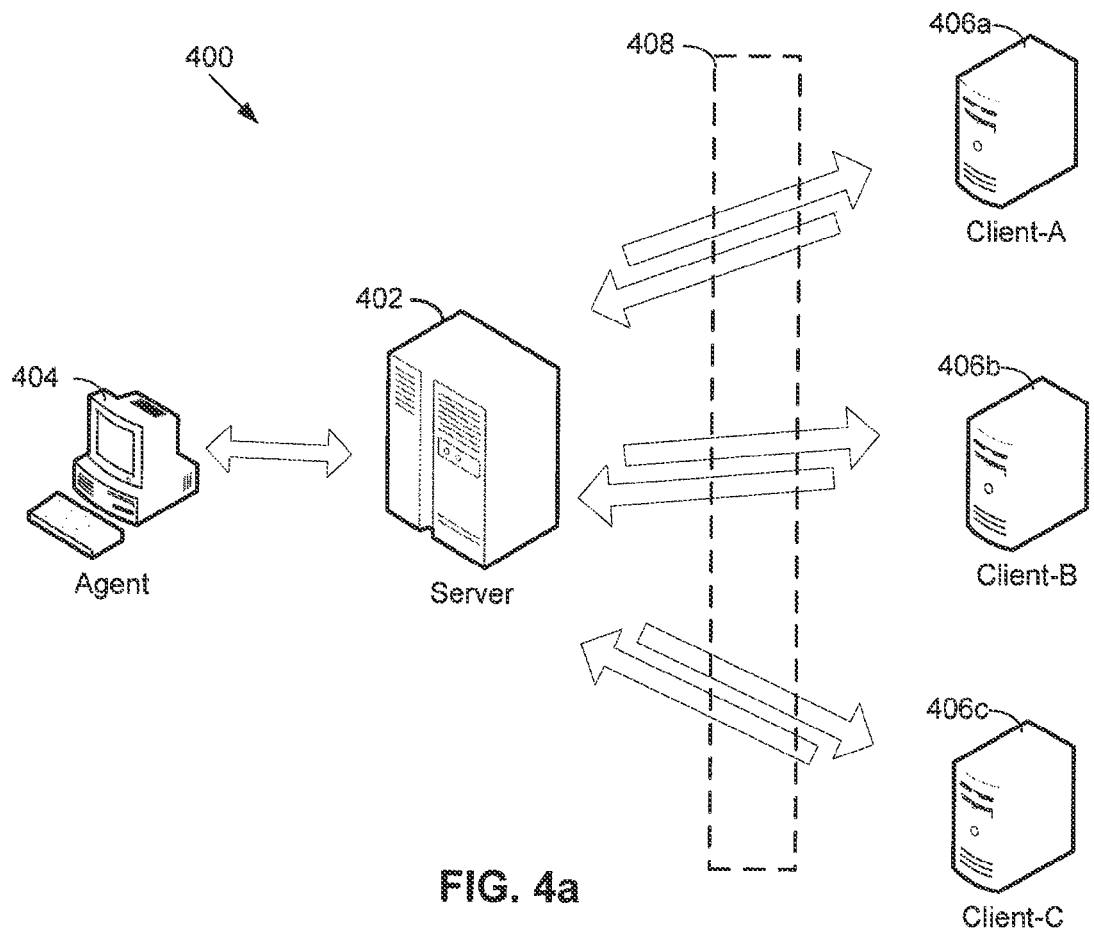
FIG. 4a is a block diagram illustrating an example of a networked client-server system with a simulation agent.

FIG. 4a provides a block diagram illustrating an example client-server system 400 that includes a server 402 that may be accessed by an agent 404, and a variety of clients 406a-c. The server 402 may include an embodiment of an enterprise application platform 112 (FIG. 1). The client 406a may include a client machine 116. The client 406b may include a client/server machine 117. The client 406b c may include a small device client machine 122. The clients 406 may communicate and interact with server 402 through an interface 408. The communications and interactions between the server 402 and the clients 406 may be logged in a trace file 310.

The variety of clients 406a-c may each be a separate system with a unique hardware and software application configurations. Two or more of clients 406a-c may share a common hardware platform and utilize different software applications. Two or more-of the clients 406a, c may share a common software application and utilize different hardware platforms. Each of the clients 406a-c may communicate and interact with server 402 through interface 408.

Clients 406a-c may include and provide mechanisms to communicate with other devices, users, databases, or equipment. For example, a client may include a communication management system (CMS) client configured to communicate and interact with a customer relationship manager (CRM) server. A CMS client may be configured to receive communications (e.g., telephone calls or on-line queries) from a customer, and interact with a CRM server based on the received communications. A CRM server may include a database of customer accounts that May be accessed or Utilized by a CRM client to facilitate communications with the customer.

Interface 408 may provide a common base of commands and interactions that may be utilized by each of the clients 406a-c. Interface 408 may provide extensions that allow individual clients (e.g., client 406a) to perform specific operations or interactions with server 402. All interactions and communications between server 402 and each of the clients 406a-c may be logged to a trace file. For example, interface 408 may include an integrated communication interface (ICI) interface that supports communication between a OM server and a CMS client.

Figure 4B:
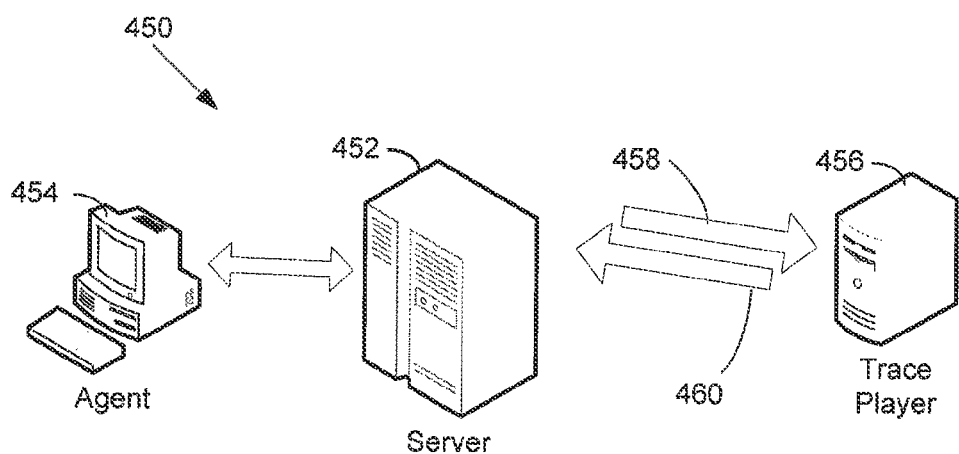
FIG. 4b is a block diagram illustrating an example of a networked simulation system.

FIG. 4b provides a block diagram illustrating an example test system 450 that may be utilized to simulate any of the configurations presented in FIG. 4a, or Any other client-server interaction. For example, a server 452 may communicate with an agent 454 that is configured to operate or control the server 452. The server may be communicatively coupled, for example through a network, to a trace placer 456. The trace player 456 may transmit requests 457 to server 452 and receive responses 560 from the server 452. Similarly the trace player 456 may provide responses to the server 452 in response to server-requests.

Trace player 456 may be an independent standalone tool to simulate communication with server 452 using the content of a trace or any user input. The trace may include a record of ICI communication between a CRM server and a CMS client.

The trace player 456 may include a user interface that provides a user with a mechanism to review or modify the contents of a trace the before the trace is played on the trace player 456. In an example, the interface may allow the user to review each interaction between the trace player 456 and the server 452 before the interaction is begun. In another example, a user may create trace content without a preexisting trace file from a client or server.

Figure 5:
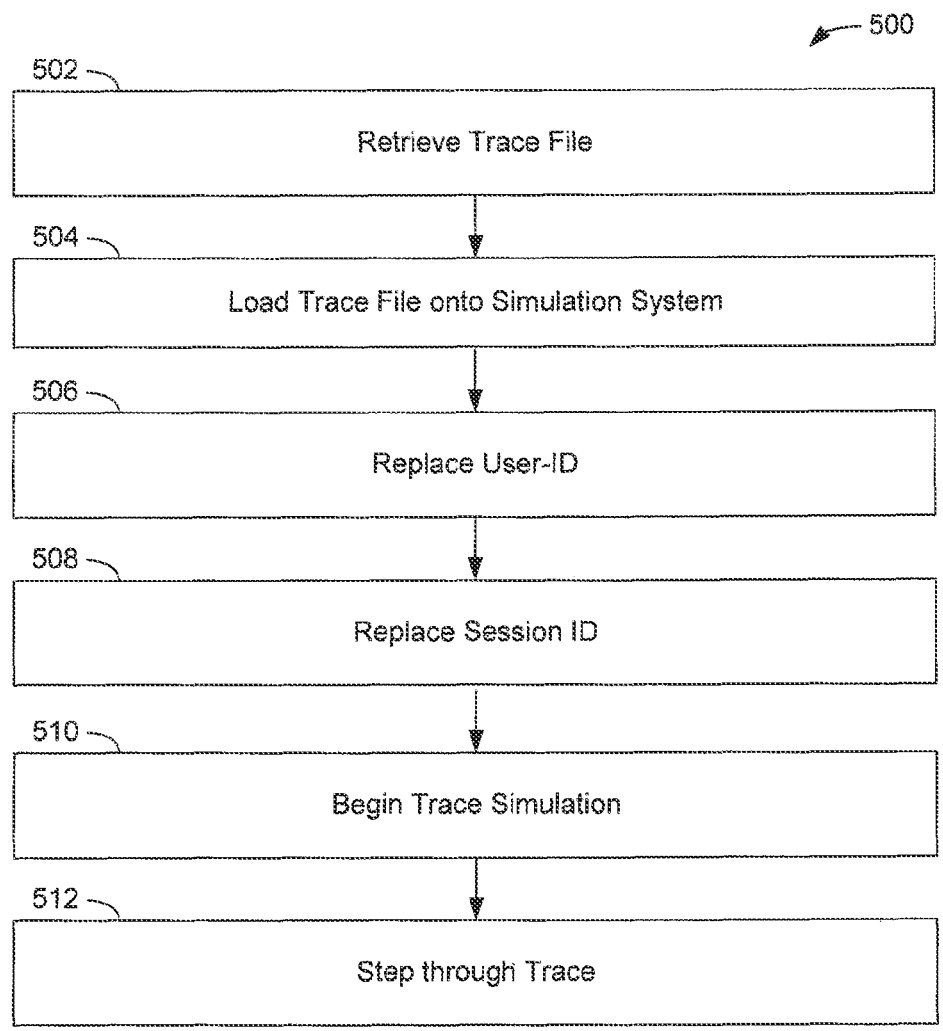
FIG. 5 is a flow diagram of an example method of preparing a trace for simulation.

FIG. 5 is a flow diagram illustrating an example method 500 of preparing a trace of an application programming interface or application interaction for replay and simulation. At 502, a trace file may be retrieved from a system, such as server 501, an enterprise application platform 112, or any client machine 508. At 504, the retrieved trace file may be loaded into a simulation system.

Continuing with the method 500, at 506 the user-identifier (user-ID) included in the trace file may be replaced. The original user-identifier in the trace may contain user information that is specific to an individual client or user that may not be available on a trace replay system. The replacement user-identifier may be a generic user-identifier for testing purposes, or a specific user-identifier associated with a user authorized to use the trace replay system.

Similar to the user-identifier replacement at 506, at 508 the session-identifier (session-ID) included in the trace file may be replaced. The original session-identifier may be unique to the client-server interactions that generated the trace file. As a server may require a unique session-identifier for each server-client session, a substitute session-identifier may be inserted into the trace file to replace the original session-ID.

At 510, the replay or simulation of a trace session may commence by establishing a connection between a trace replay client and a server. A second replay trace log may be generated to record the interactions between the server and the trace replay client. At 512, the trace replay client may automatically step through each of the interactions in the trace file, thereby simulating the actions of a specific client with a server. In an example, the replay client may include a user interface that allows a user to manually select the rate at which the trace simulation is conducted. For example, a user may limit the rate of the simulation to one request/response pair every thirty seconds, two minutes, five minutes or other user specified time interval.

While the operations 502 through 508 of the method 500 of FIG. 5 are shown in a specific order, other orders of operation, including possibly concurrent execution of at least portions of one or more operations, may be possible in some implementations. For example, the user-id and session-id may be replaced concurrently or in a different order in some implementations.

Figure 6:
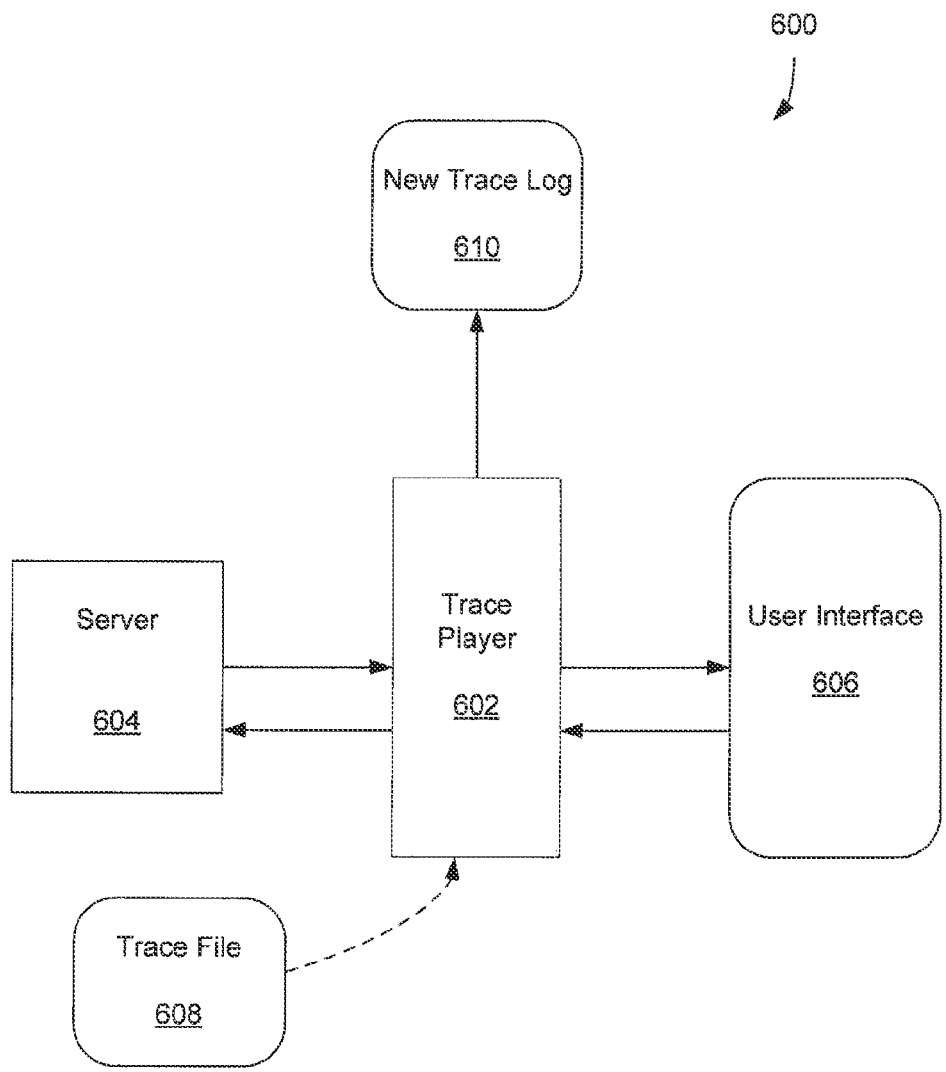
FIG. 6 is block diagram of a trace simulation system.

FIG. 6 provides a block diagram of a trace simulation system 600 illustrating an example of the interactions with an example trace player 602. A trace player may be configured to communicate with a server 604. The communications between the trace player 602 and the server 604 May be automated or in response to user input through a user interface 606. The trace player 602 may receive a trace file 608 that contains a record of previous interactions between a client (not shown) and server 604 or a different server device. The trace player 602 may generate a new trace log 610 that includes a record Of the interactions between the trace player 602 and the server 604.

While the above discussion focuses on enterprise applications and platforms and their associated client systems, any device executing software or firmware may benefit from application of the various principles described herein. For example, the tracing techniques discussed above may be implemented in general-purpose computing systems, as well as in special-purpose embedded systems, such as cellular phones, personal digital assistants (PDAs), computer tablets, entertainment system components, "smart" appliances, gaming systems, and so on.

Figure 7:
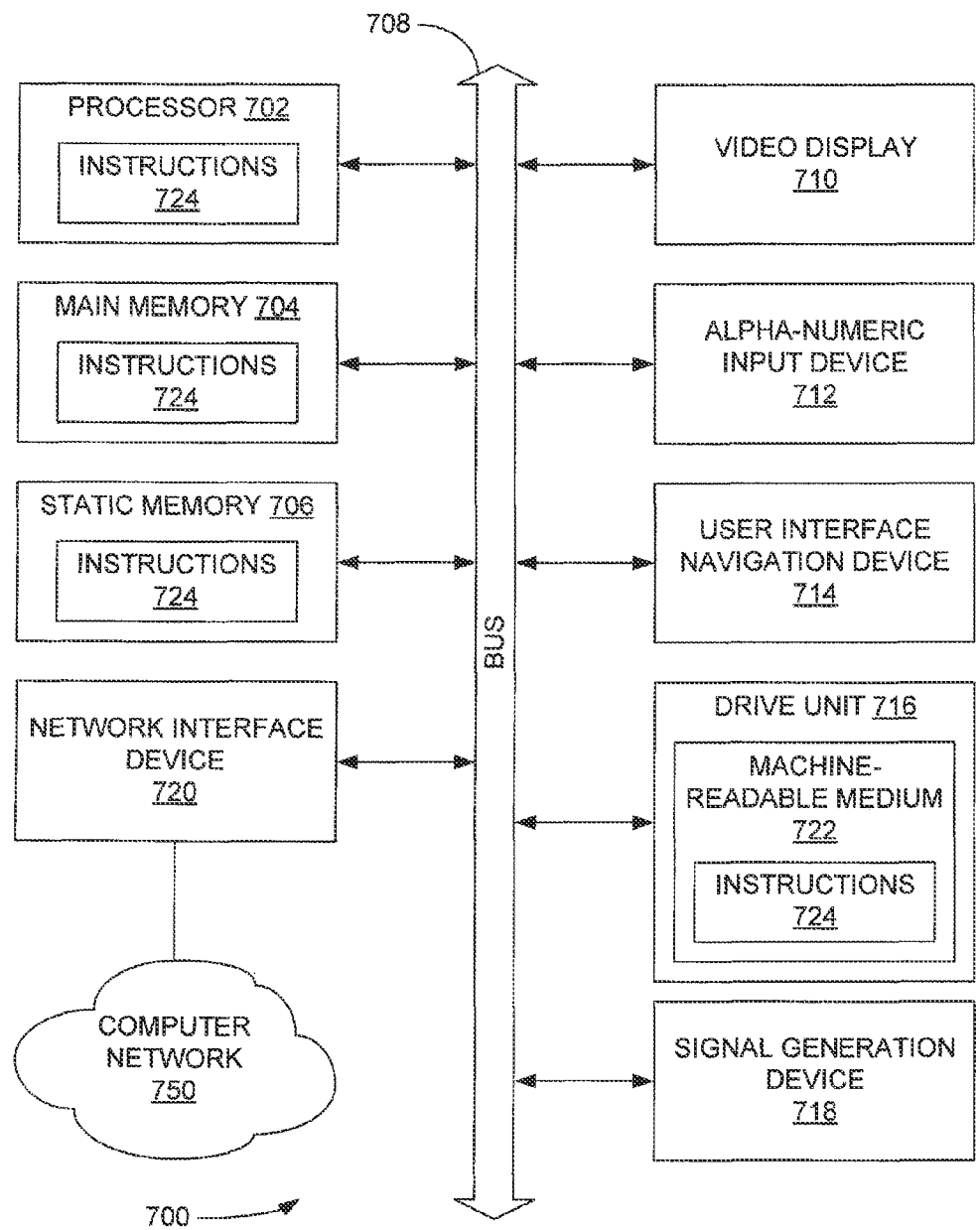
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid Crystal display (LCD), or a cathode ray tube (CRT)). The processing System 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic, or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware Module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e,g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device, to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A computerized method for simulating a server interface for a plurality of clients, the server interface including a plurality of interface message types, the method comprising:
   creating a trace entry for each one of a plurality of transactions through the server interface for each client;
   generating a dynamic identifier in the trace entries for each client and each client session;
   recording in the trace entry, a message type, and message data for each one of the plurality of transactions;
   transferring a collection of trace entries for an individual one of the plurality of clients to a trace player;
   replacing the dynamic identifier in the trace entries with a simulation identifier associated with the trace player; and
   replaying an interaction between the server interface and the individual one of the plurality of clients.

2. The method of claim 1, comprising:
   recording a user identifier in the collection of trace entries; and
   replacing the user identifier at the trace player with a player identifier.

3. The method of claim 1, further comprising:
   performing a test of a client application using the collection of trace entries, the collection of trace entries comprising a sequence of interactions between the client application and a server application.

4. The method of claim 1, comprising: storing the trace entry a log file at the server.

5. The method of claim 1, comprising: storing the trace entry in a log file at the client.

6. The method of claim 1, comprising: receiving, through an interactive user interface mechanism, modifications to trace entries prior to or during the replay of the interaction between the server and the client.

7. The method of claim 1, comprising: parsing the collection of trace entries for server interface message types.

8. The method of claim 1 wherein the server is a customer relationship manager (CRM) and the client is a communication management system (CMS).

9. The method of claim 8, wherein the server interface includes a simple object access protocol (SOAP) interface.

10. The method of claim 8, wherein the server interface includes an integrated communication interface (ICI) compatible protocol.

11. A non.-transitory computer-readable storage medium comprising instructions that, when executed by at least one processor of a machine having a server interface that supports a plurality of interface message types, cause the machine to perform operations comprising:
   creating a trace entry for each one of a plurality of transactions through the server interface for a client;
   generating a dynamic identifier in the trace entries each client and each client session;
   recording in the trace entry, a message type, and message data for each one of the plurality of transactions;
   transferring a collection of trace entries for an individual one of the plurality of clients to a trace player;
   replacing the dynamic identifier in the trace entries with a simulation identifier associated with the trace player; and
   replaying an interaction between the server and the clients.

12. The non-transitory computer-readable storage medium of claim 11, the operations further comprising:
  recording a user identifier in the collection of trace entries; and
  replacing the user identifier at the trace player with a player identifier.

13. The non-transitory computer-readable storage medium of claim 11, the operations further comprising:
  receiving, through an interactive user interface mechanism, modified trace entries prior to or during the replay of the interaction between the server and the client.

14. The non-transitory computer-readable storage medium of claim 11, the operations further comprising:
  parsing the collection of trace entries for server interface message types.

15. The non-transitory computer-readable storage medium of claim 11, wherein the server is a customer relationship manager (CRM) and the client is a communication management system (CMS), and the server interface includes a simple object access protocol (SOAP) interface.

16. The non-transitory computer-readable storage medium of claim 15, wherein the server interface includes an integrated communication interface (ICI) compatible protocol.

17. A system comprising:
  a machine having a memory and at least one processor; and
  at least one module on the machine, the at least one module being configured:
    create a trace entry for each one of a plurality of transactions through the server interface for each client;
    generate a dynamic identifier in the trace entries for each client and each client session;
    record in the trace entry, a message type, and message data for each one of the plurality of transactions;
    replace the dynamic identifier in the trace entries with a simulation identifier associated with the trace player: and
    replay an interaction between the server interface and the individual one of the plurality of clients.

18. The system of claim 17, wherein the at least one module is further configured to:
  record a user identifier in the collection of trace entries; and
  replace the user identifier at the trace player with a player identifier.

19. The system of claim 17, wherein the at least one module is further configured to:
  receive, through an interactive user interface mechanism, modified trace entries prior to or during the replay of the interaction between the server and the client.

20. The system of claim 17, wherein the at least one module is further configured to:
  parse the collection of trace entries for server interface message types.

21. The system of claim 17, wherein the wherein the server is a customer relationship manager (CRM) and the client is a communication management system (CMS), and the server interface includes a simple object access protocol (SOAP) interface.

22. The system of claim 17, wherein the server interface includes an integrated communication interface (ICI) compatible protocol.

* * * * *